(12) United States Patent
Czaplewski-Campbell et al.

(10) Patent No.: US 10,954,131 B2
(45) Date of Patent: Mar. 23, 2021

(54) BIOCIDAL JANUS PARTICLES

(71) Applicant: International Business Machines Corporation, Armonk, NY (US)

(72) Inventors: Sarah K. Czaplewski-Campbell, Rochester, MN (US); Jason T. Wertz, Pleasant Valley, NY (US); Joseph Kuczynski, North Port, FL (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/150,303

(22) Filed: Oct. 3, 2018

(65) Prior Publication Data
US 2020/0109055 A1    Apr. 9, 2020

(51) Int. Cl.
*C01B 33/14* (2006.01)
*A01N 31/16* (2006.01)
*A01N 55/00* (2006.01)
*C07F 7/18* (2006.01)

(52) U.S. Cl.
CPC .............. *C01B 33/14* (2013.01); *A01N 31/16* (2013.01); *A01N 55/00* (2013.01); *C07F 7/1804* (2013.01)

(58) Field of Classification Search
CPC ....... C01B 33/14; C07F 7/1804; A01N 31/16; A01N 55/00
See application file for complete search history.

(56) References Cited

U.S. PATENT DOCUMENTS

| 5,180,585 | A | 1/1993 | Jacobson et al. |
| 7,311,766 | B2 | 12/2007 | Nyden et al. |
| 7,868,198 | B2 | 1/2011 | Laine et al. |
| 2002/0187340 | A1* | 12/2002 | Posey .................... B32B 27/08 428/336 |

(Continued)

FOREIGN PATENT DOCUMENTS

WO    2010081480 A2    7/2010

OTHER PUBLICATIONS

Jadhav et al., "Polymerizable Ligands as stabilizers for Nanoparticles", Particle and Particle Systems Characterization, Oct. 2014. (Year: 2014).*

(Continued)

*Primary Examiner* — Jianfeng Song
(74) *Attorney, Agent, or Firm* — Kelsey M. Skodje

(57) ABSTRACT

A material, a process for forming a biocidal material, and an article of manufacture. The material includes a particle and first and second functionalities bound to first and second faces of the particle. At least one of the first and second functionalities are biocides. The process includes forming colloidosomes having particles with exposed first faces partially embedded in a wax droplet. The process also includes selecting first and second functionalities, wherein at least one of the first and second functionalities are biocides, and binding the first functionalities to the first faces of the particles. Further, the process includes removing the particles from the colloidosome, and binding the second functionalities to the second faces. The article of manufacture includes a polymer matrix, particles, first functionalities bound to first faces of the particles, and second functionalities bound to second faces of the particles.

6 Claims, 6 Drawing Sheets

(56) References Cited

U.S. PATENT DOCUMENTS

| | | |
|---|---|---|
| 2012/0183619 A1 | 7/2012 | Lellouche et al. |
| 2016/0150778 A1 | 6/2016 | Winkler et al. |

OTHER PUBLICATIONS

Perro et al., "Production of large quantities of "Janus" nanopartilces using wax-in-water emulsions", Colloids and Surface A: Physicochemical and Engineering Aspects, 332 (2009), 57-62. (Year: 2009).*

Lopez et al., "Janus Mesoporous Silica Nanoparticles for Dual Targeting of Tumor Cells and Mitochondria", ACS Appl. Mater. Interfaces, 2017, 9, 26697-26706. (Year: 2017).*

Dong et al., "Immobilization of Cyclic N-Halamine on Polystyrene-Functionalized Silica Nanoparticles: Synthesis, Characterization, and Biocidal Activity," J. Phys. Chem C, 2010, 114 (41), pp. 17298-17303. DOI: 10.1021/jp104083h.

Kees, F., "Dimythyl fumarate: a Janus-faced substance?", Expert Opinion on Pharmacotherapy, 2013 (Published online: May 22, 2013), 14(11), pp. 1559-1567. DOI: 10.1517/14656566.2013. 804912.

Malmsten, M., "Nanomaterials as Antimicrobial Agents," Handbook of Nanomaterials Properties, Bhushan et al. (eds), 2014, pp. 1053-1075, Springer-Verlag Berlin Heidelberg 2014. DOI 10.1007/978-3-642-31107-9_25.

Boomsma et al., "L-Lactic Acid—A Safe Antimicrobial for Home- and Personal Care Formulations," SOFW Journal, Oct. 2015, 141, pp. 1-5.

Kirillova et al., "Hybrid Hairy Janus Particles as Building Blocks for Antibiofouling Surfaces," ACS Applied Materials & Interfaces, Research Article, 2016, pp. 32591-32603, ACS Publications. DOI: 10.1021/acsami.6b10588.

Makarovsky et al., "Novel Triclosan-Bound Hybrid-Silica Nanoparticles and their Enhanced Antimicrobial Properties," Advanced Functional Materials, 2011, pp. 1-10, Wiley-VCH Verlag GmbH & Co. KGaA. DOI: 10.1002/adfm.201101557.

Neubauer et al., "facts: Safe and efficient bacterial disinfection with bio-based lactic acid," Jungbunzlauer, 2015, pp. 1-8.

Perro et al., "Production of large quantities of "Janus" nanoparticles using wax-in-water emulsions," Colloids and Surfaces A: Physicochemical and Engineering Aspects, vol. 332, Issue 1, Jan. 5, 2009, pp. 57-62. https://doi.org/10.1016/j.colsurfa.2008.08.027.

Russell et al., "Microbial Susceptibility and Resistance to Biocides," ASM News, Jan. 1997, vol. 63, No. 9, pp. 481-487.

"Effects of the Active Substances in Biocidal Products on Antibiotic Resistance," Scientific Committee on Emerging and Newly Identified Health Risks (SCENIHR), Nov. 2008, pp. 1-83.

"List of active molecules in biocidal products classified on the basis of chemical groups," GreenFacts, pp. 1-3, (Printed: Jun. 6, 2018). http://copublications.greenfacts.org/en/biocides-antibiotic-resistance/figtableboxes/1.htm.

Störer et al., "Controlled Growth of Monodisperse Silica Spheres in the Micron Size Range," Journal of Colloid and Interface Science, 1968, vol. 26, pp. 62-69.

Thomas et al., "Silicones Containing Pendant Biocides for Antifouling Coatings," Biofouling, The Journal of Bioadhesion and Biofilm Research, Aug./Oct. 2004, vol. 20 (4/5), pp. 227-236. DOI: 10.1080/08927010400011229.

Williams, T., "The Mechanism of Action of Isothiazolone Biocides," PowerPlant Chemistry, 2007, 9(1), pp. 14-22. www.ppchem.com/free/ppchem-01-2007-2.pdf.

* cited by examiner

BIOCIDAL JANUS PARTICLES

BACKGROUND

The present disclosure relates to biocides and, more specifically, to Janus particles with biocidal functionalities.

Janus particles are nano- or microparticles named after the Ancient Roman god of duality because they are "two-faced" particles. That is, a Janus particle has two different regions, or faces, having asymmetric physical and chemical properties (e.g., different core materials, coatings, or orthogonal functionalities). For example, different orthogonal functionalities on each face can allow a single particle to simultaneously carry out more than one type of chemistry (e.g., adhesion and water-repellence). The dual properties of a Janus particle allow it to have applications that can include drug delivery, biomedical imaging, magnetolytic therapy, electronic paper, solid surfactants, emulsion stabilization, catalysis, microprobes, micromotors, water-repellent fibers or coatings, and combinations thereof.

SUMMARY

Various embodiments of the present disclosure are directed to a material that includes a particle, first functionalities bound to a first face of the particle, and second functionalities bound to a second face of the particle, wherein at least one of the first functionalities and the second functionalities are biocides. The material can also include a polymer matrix. The particle can be a silica nanoparticle, and the biocides can be derived from triclosan. One of the first functionalities and the second functionalities can be perfluorocarbons or matrix-binding functionalities, such as vinyl, epoxy, or acrylate groups.

Additional embodiments of the present disclosure are directed to a process of forming a biocidal material, which includes forming colloidosomes, respective colloidosomes having particles partially embedded in a wax droplet, such as a paraffin wax droplet, so that the particles have exposed first faces. The process also includes selecting first and second functionalities, wherein at least one of the first and second functionalities are biocides. Further, the process includes binding the first functionalities to the first faces of the particles. The particles are then removed from the colloidosome to expose second faces of the particles. The removing can include dissolving the wax droplet in a hydrophobic solvent. The process can include binding the second functionalities to the second faces of the particles. The source of the first or second functionalities can be triclosan-(3-triethoxysilyl) propyl isocyanate or vinyl chloride. In some instances, the first functionalities are the biocides and the second functionalities are perfluorocarbons, though the second functionalities can be biocides. The process can also include incorporating the particles into a polymeric matrix.

Further embodiments of the present disclosure are directed to an article of manufacture that includes a polymer matrix, as well as particles having first faces bound to first functionalities and second faces bound to second functionalities. At least one of the first and second functionalities are biocides. The first or second functionalities can also be matrix-binding functionalities. The polymer matrix can be a vinyl polymer or a polyester. The article of manufacture can also include a rheology control agent.

DETAILED DESCRIPTION

Figure 1:
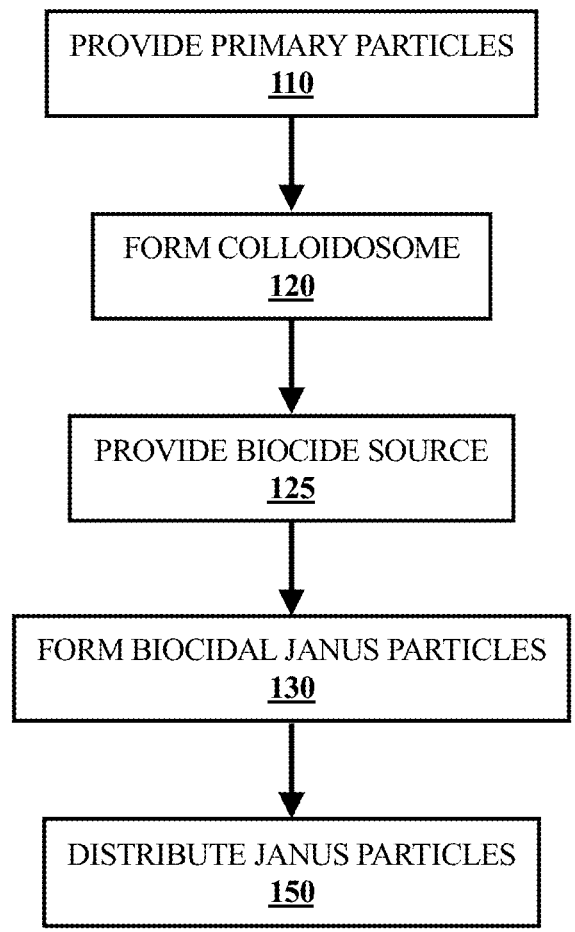
FIG. 1 is a flow diagram illustrating a process of preparing biocidal Janus particles, according to some embodiments of the present disclosure.

Biocides are substances or mixtures intended to protect against organisms such as bacteria, molds, protozoans, archaea, protists, amoebas, fungi, viruses, parasites, algae, barnacles, seaweed, tubeworms, etc. Biocides prevent or inhibit the growth of these organisms through varying modes of action and breadths of activity. Mode of action refers to how a biocide acts on a target organism (e.g., by damaging cell membranes, inactivating specific enzymes, or interfering with metabolic processes), and breadth of activity refers to the number of sites on which the biocide acts. For example, some biocides act against a single step in an organism's metabolic processes, while other biocides act against more than one step in at least one metabolic process. Examples of biocides include lactic acid, chlorhexidine, quaternary ammonium compounds, etc.

Another example of a biocide is triclosan (5-chloro-2-(2, 4-dichlorophenoxy)phenol). Triclosan is a Food and Drug Administration (FDA)-approved synthetic antimicrobial compound. Triclosan is primarily an antibacterial agent, but it exhibits some antifungal and antiviral activity as well. The thermal stability of triclosan (up to 2 h at 200° C.) allows it to be incorporated into a variety of polymeric materials used in applications such as plastics, coatings, and textiles.

Biocides are blended with or used to coat a variety of materials for different applications. For example, biocides are commonly used to remove or prevent biofouling. "Biofouling" broadly refers to the accumulation of organisms on wetted surfaces (e.g., pipes, marine vessels and equipment, medical devices, etc.) Equipment for many industries (e.g., paper manufacturing, food processing, underwater construction, fishing, water treatment, etc.) must be maintained in the presence of sufficient water for biofouling. This biofouling can damage and/or contaminate the equipment. In addition to causing damage, biofouling on marine vessel surfaces can cause drag increases, resulting in the need for larger amounts of fuel to compensate for reductions in speed. These are costly problems that require improved preventative measures.

In another example, the growth of mold and other microorganisms can occur on caulking and sealing materials, which are used for sealing joints between surfaces. Caulks and sealants are often used to fill gaps between building materials such as those commonly found in kitchens and bathrooms (e.g., at bathtubs, sinks), interior window and door casings, baseboards, exteriors (e.g., foundations, siding, roofing, window/door exteriors, etc.), concrete tunnels, and piping. The terms "caulk" and "sealant" are often used interchangeably, but sealants are typically elastomers. Examples of materials that can be used in caulks and sealants include latex, vinyl latex, silicone, polyurethane, acrylic/latex blends, acrylic/latex/silicone blends, siliconized acrylic, butyl rubber, adhesives, asphalt, etc. The ingress of mold and other microorganisms into these materials can make them difficult to clean. Therefore, caulks and sealants may be blended with biocidal additives.

However, there can be disadvantages to adding biocides to polymeric materials. For example, biocidal additives may leach out of the material, causing environmental damage and unintentional harm to exposed organisms. Additionally, polymeric materials often include a variety of additives (e.g., plasticizers, corrosion inhibitors, flame retardants, hardeners, stabilizers, etc.), but large quantities of additives can cause mechanical problems, as well as adding cost and inconvenience. Therefore, optimization of biocides and other polymer additives is of interest.

Multifunctional Janus particles having surface-bonded biocidal molecules are disclosed herein. Approximately half of the surfaces of the respective biocidal Janus particles disclosed herein is covered with a biocidal functionality. The remaining surfaces of the respective particles are covered by another orthogonal functionality. The multifunctionality of these Janus particles can provide greater control over material properties (e.g., location and movement of the particles within a polymer matrix). Further, the particles provide a single biocidal additive with customizable added features. For example, the remaining surface can be bound to an additional variety of biocide, a lubricating functionality, a matrix-binding functionality, a flame retardant, etc.

FIG. 1 is a flow diagram illustrating a process 100 of preparing biocidal Janus particles, according to some embodiments of the present disclosure. Process 100 begins with the provision of primary particles. This is illustrated at step 110. The primary particles are silica particles that can be synthesized in situ or obtained from another source (e.g., a commercial source). First and second surface regions (faces) of the primary particles are functionalized in subsequent steps in order to form Janus particles. Herein, "particle" refers to nanoparticles or microparticles having an approximately spherical shape. The term "particle size" refers to a particle size evaluated for a spherical object. However, the shapes of particles may be irregular and non-spherical. Therefore, particle size dimensions are based on replacing a given particle with an imaginary sphere having properties (e.g., volume, weight, area, and/or drag coefficient) of the particle.

The size of the sphere can be expressed in various ways (e.g. volume, diameter, radius, weight, surface area, etc.). Herein, particle size is defined by diameter unless otherwise specified. For example, "a 200 nm particle" would refer to a particle having a diameter of 200 nm. In real systems, particles are generally present as ensembles having different sizes, and the size for a given ensemble can be described by an average particle size (e.g., median size, geometric mean size, or average size) or a particle size distribution, which is a mathematical function or a list of values that defines average particle size obtained for a sample of particles, sorted according to size.

The sizes of primary particles prepared in situ can be controlled using a variety of well-known size control techniques. Examples of these techniques include adjusting reaction parameters such as pH, temperature, stir speed, reaction time, solvent(s), concentration of reactants, etc. Synthesis of silica primary particles is discussed in greater detail with respect to FIG. 2. In some embodiments, the particles are nanoparticles having size distributions within a range of about 20 nm-200 nm, 100 nm-200 nm, 20 nm-150 nm, or 100 nm-150 nm. However, particles of any conventional size can be synthesized (e.g., about 1 nm-1000 nm, 1 nm-800 nm, 1 nm-400 nm, 1 nm-200 nm, etc.). The primary particles may also be microparticles, which have average sizes in the micron range (e.g., 1 µm-10 µm or 10 µm-1000 µm).

Figure 2:
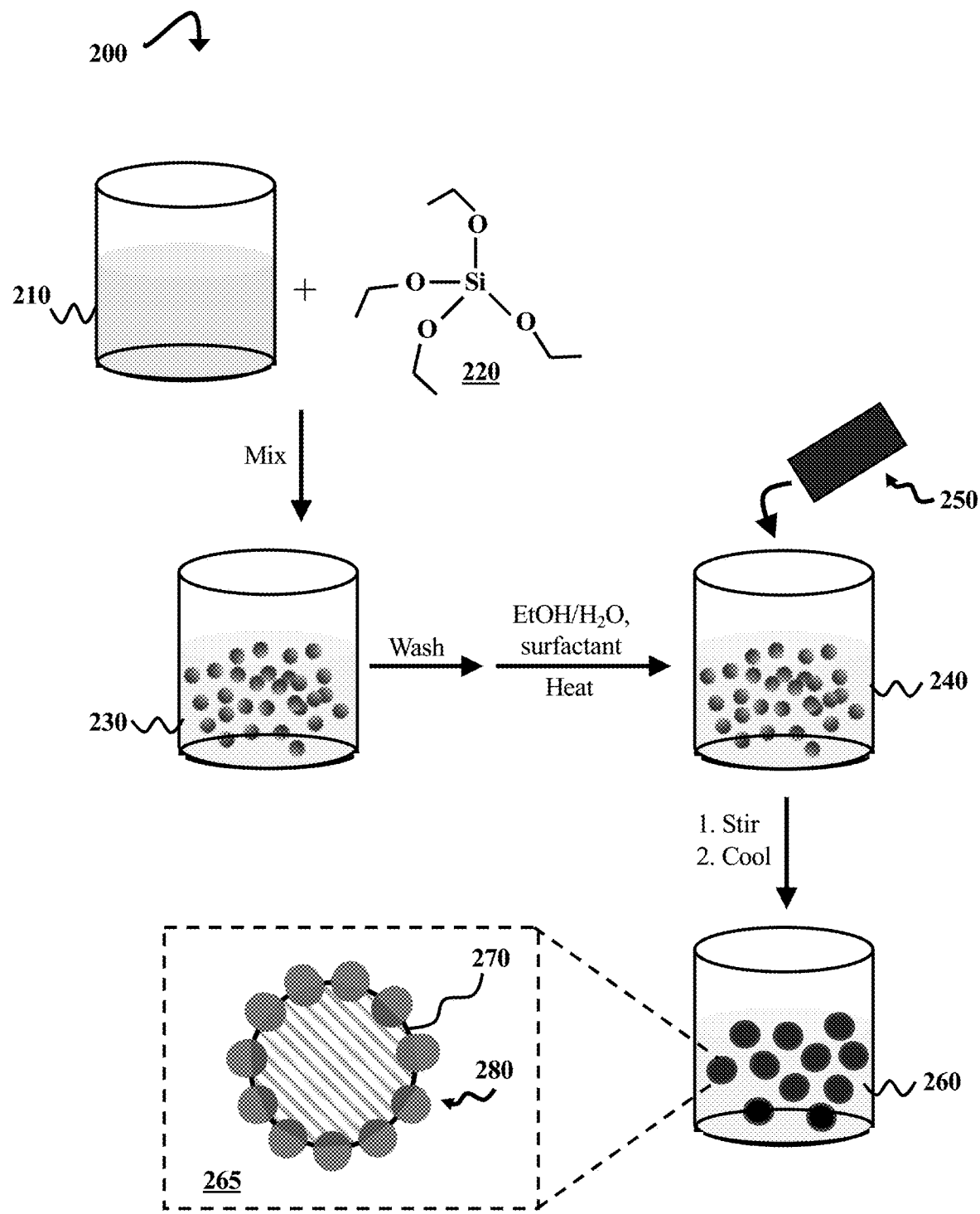
FIG. 2 is a schematic diagram illustrating a process of forming colloidosomes, according to some embodiments of the present disclosure.

A colloidosome, which includes the primary particles partially embedded in a wax droplet, is then formed. This is illustrated at step 120. Janus particles having two sides, or "faces", with different functionalities are formed in subsequent steps. In order to accomplish this, about half (e.g., 40-60%) of a particle's surface is shielded prior to functionalization of a first particle face. This shielding is carried out by embedding the primary particles in the surfaces of wax droplets, forming the colloidosomes. In the colloidosomes, each embedded primary particle has a face exposed to external solvents and reactants (first face), and a face shielded by the wax droplet (second face). An example of colloidosome formation is illustrated in FIG. 2.

Figure 3:
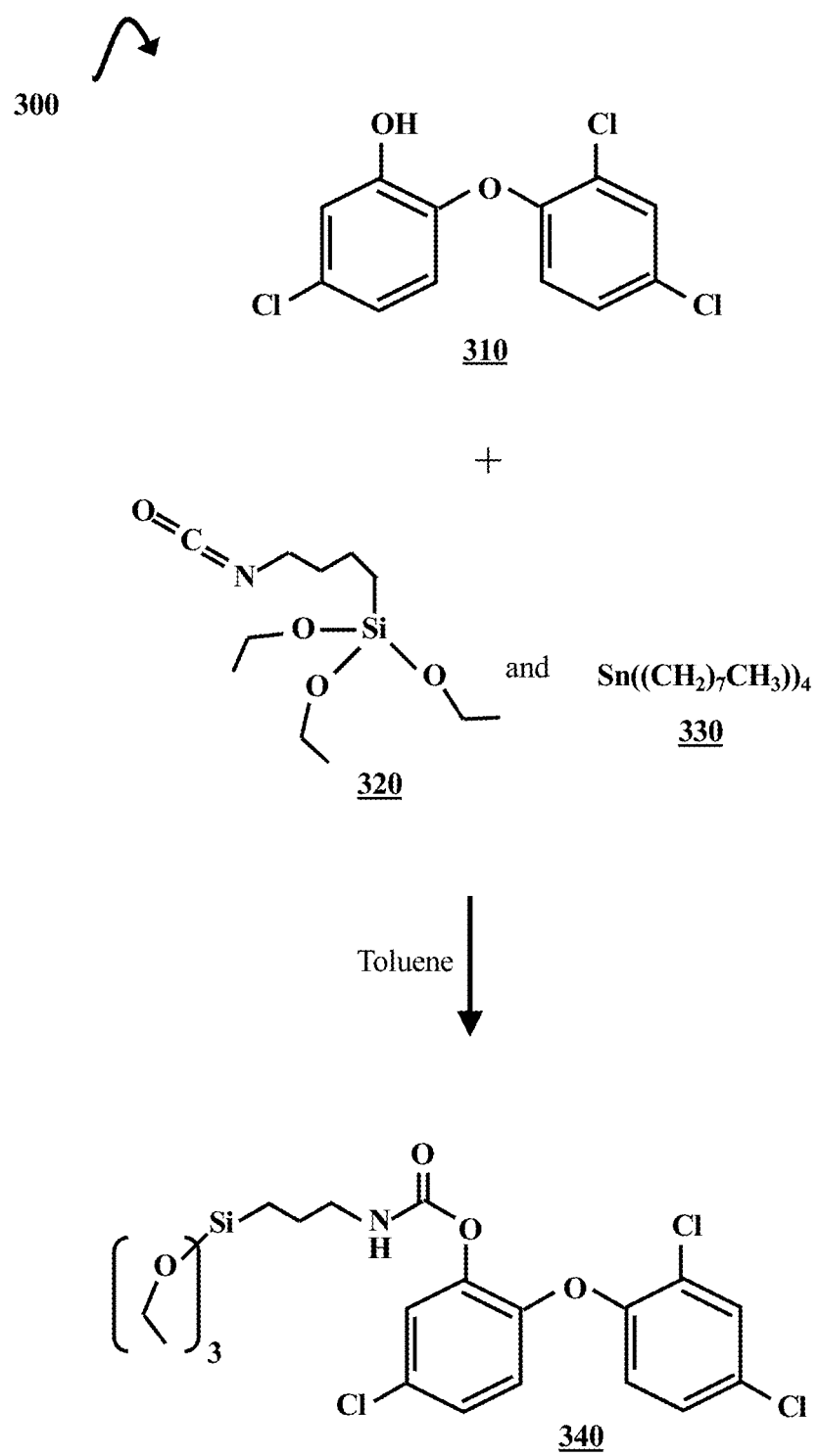
FIG. 3 is a chemical reaction diagram illustrating a process of modifying a biocidal compound to include a silica-binding moiety, according to some embodiments of the present disclosure.

At least one source of biocide functionalities is then provided. This is illustrated at step 125. Herein, "biocide" refers to any compound or functionality intended to prevent or inhibit the growth of organisms such as microorganisms and molds. Additional examples of organisms that can be targeted by the biocides are discussed in greater detail above. Biocidal orthogonal functionalities can be derived from triclosan or another bis-phenol biocide, such as dihydroxydiphenylmethane derivatives (e.g., bisphenol A and bisphenol F) or hydroxydiphenylether derivatives (e.g., substituted triclosan derivatives). An example synthesis of a triclosan-derived biocide functionality source is illustrated in FIG. 3.

Additional examples of phenol biocides that can be used as sources of biocidal functionalities can include cresol, 4-tert-octylphenol, 2-phenylphenol, phenoxyethanol, 2,4,6-trichlorophenol, pentachlorophenol, 4-chloro-3-methylphenol, 4-chloro-3,5-dimethylphenol, 2,4-dichloro-3,5-dimethylphenol, 4-chloro-2-phenylphenol, 2-benzyl-4-chlorophenol, nitrophenols, resorcinols (e.g., resorcinol, 4-hexylresorcinol, phenylethyl resorcinol, phenylpropyl resorcinol, and (Z,Z)-5-(tridec-4,7-dienyl)resorcinol), and 23-methyl-6-O-desmethylauricepyrone. Non-phenolic biocides can also be used. In some embodiments, additional modifications known to one of skill in the art are required in order to prepare non-phenolic biocides for binding to the Janus particle face. For example, the biocide may be hydroxylated. Additionally, the Janus particle surface may be optimized for binding to appropriate functional groups on a biocide of choice (e.g., by attaching linkers).

Examples of non-phenolic biocides that may be used can include aromatic diamidines (e.g., propamidine and dibromopropamidine), biguanides (e.g., chlorhexidine, alexidine, and polymeric biguanides), glutaraldehyde, o-phthalaldehyde, antimicrobial dyes (e.g., acridines, triphenylmethane dyes, and quinones), iodophors, quinoline derivatives (e.g., 8-hydroxyquinoline, and 4-aminoquinaldinium), isoquinoline derivatives, alcohols (e.g., 2-bromo-2-nitro-1,3-diol, chlorobutanol, and 2,4-dichlorobenzyl alcohol), diphenylsulfide derivatives, anilides (e.g., salicylanilide and diphenylureas), 2,6-dimethyl-1,3-dioxan-4-ol acetate, 5-bromo-5-nitro-1,3-dioxane, imidazoles (e.g., 1,3-di(hydroxymethyl)-5,5-dimethyl-2,4-dioxoimidazole, 1,3-di(hydroxymethyl)-5,5-dimethylhydandoin, imidazolidinyl urea, and diazolidinyl urea), isothiazolones (e.g., 2-methyl-4-isothiazolin-3-one, 5-chloro-2-methyl-4-isothiazolin-3-one, 2-n-octyl-4-isothiazolin-3-one, and 1,2-benzisothiazolin-3-one), triazines, oxazolo-oxazoles, sodium hydroxymethylglycinate, methylene bisthiocyanate, captan, 1,2-dibromo-2,4-dicyanobutane, limonene, and organic or inorganic acids (e.g., acetic acid, propionic acid, 2,4-hexadienoic acid, lactic acid, benzoic acid, salicylic acid, dehydroacetic acid, sulfites, bisulfites, and salts or esters thereof). In some instances, organometallic biocides can be used as well. Examples of these can include organotins, copper-based compounds (e.g., copper triethylenetetramine and copper-8-quinolinolate), and zinc-based compounds (e.g., zinc pyrithione).

Figure 4A:
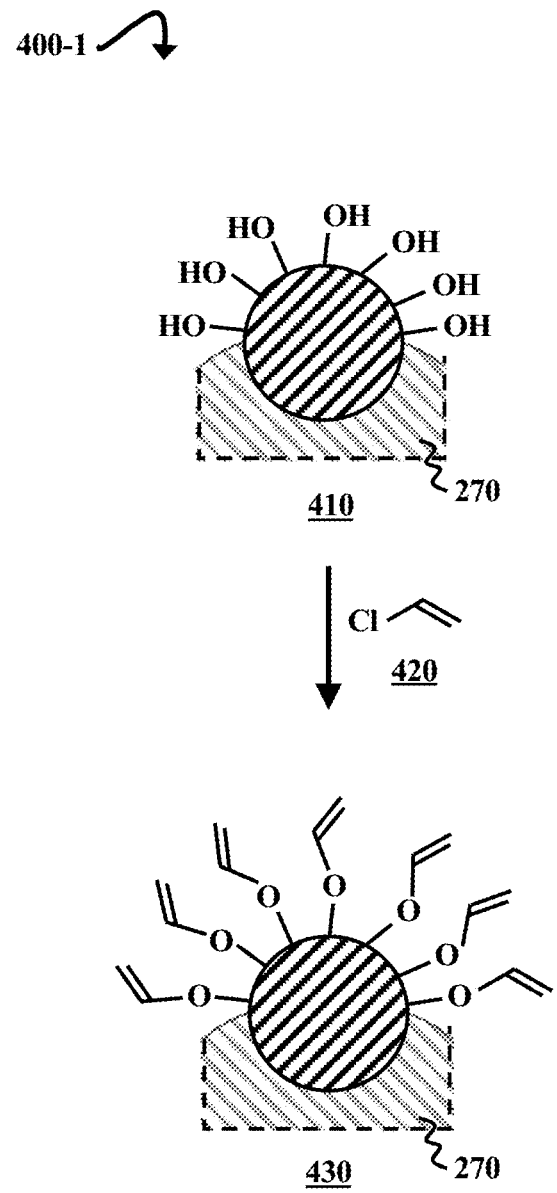
FIG. 4A is a chemical reaction diagram illustrating a process of attaching polymer matrix-binding functionalities to a first face of a colloidosomal silica particle, according to some embodiments of the present disclosure.
Figure 4B:
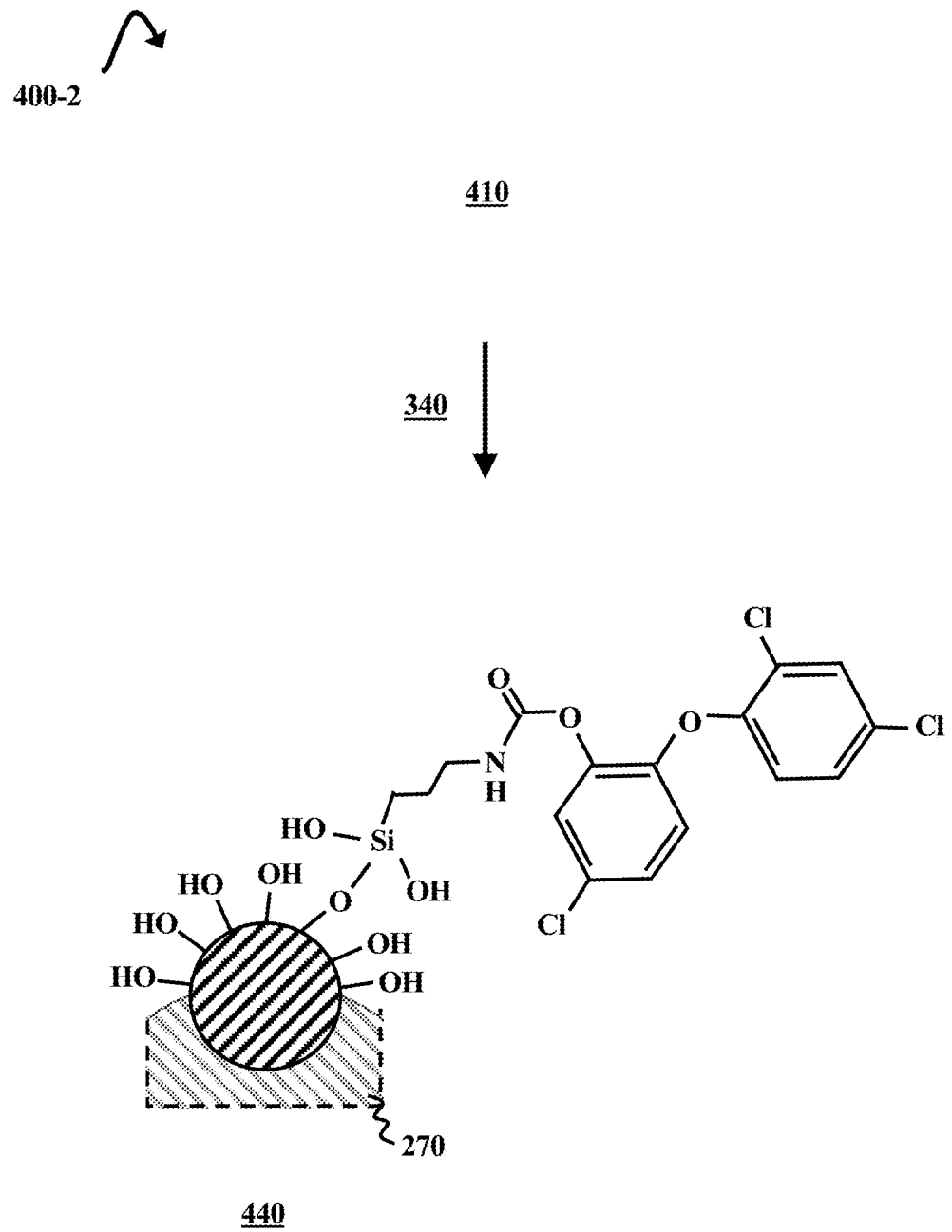
FIG. 4B is a chemical reaction diagram illustrating a process of attaching biocidal functionalities to a first face of a colloidosomal silica particle, according to some embodiments of the present disclosure.

Biocidal Janus particles are then formed. This is illustrated at step 130. In the first part of this step, the exposed first faces of the primary particles in the colloidosomes are functionalized. In some embodiments, the first faces are functionalized with a biocide, though functionalities other than biocides can also be applied to the first faces. Examples of reactive functionalities other than biocides that can be bound to a Janus particle face can include matrix-binding functionalities (e.g., vinyl, amine, epoxide, allyl, and acrylate groups), lubricating functionalities (e.g., fluorinated hydrocarbyl groups), flame-retardant functionalities (e.g., phosphate-based, phosphonate-based, and brominated hydrocarbyl groups), etc. Examples of these functionalization processes are illustrated in FIGS. 4A and 4B, respectively.

The non-biocidal functionalities can also include moieties in addition to the aforementioned reactive functional groups. This can include additional reactive groups, as well as less reactive hydrocarbyl groups that may allow tuning of hydrophobicity and steric properties. Examples of hydrocarbyl groups can include cyclic and/or acyclic aliphatic moieties optionally containing one or more double and/or triple bonds (e.g., alkyl, alkenyl, alkynyl, cycloalkyl, cycloalkenyl, alkaryl, and aralkyl groups). The acyclic aliphatic groups (e.g., hydrocarbon chains having 1-40 carbon atoms) can be branched or unbranched. In some embodiments, the hydrocarbyl moieties contain heteroatoms (e.g., nitrogen, oxygen, halogens, sulfur, etc.), but this is optional.

Figure 5:
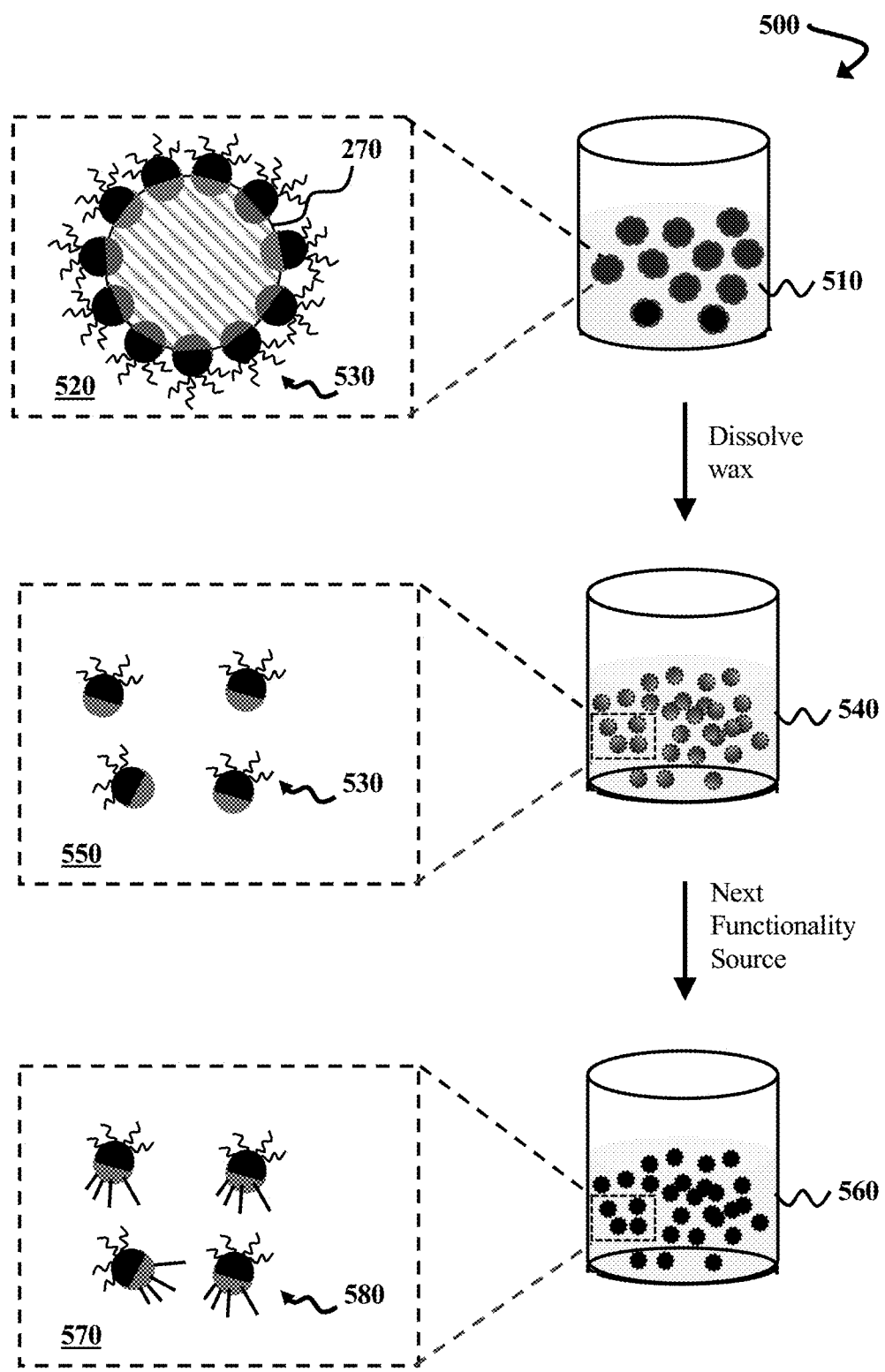
FIG. 5 is a chemical reaction diagram illustrating a process of functionalizing second faces of partially functionalized particles, according to some embodiments of the present disclosure.

The partially functionalized embedded Janus particles are then released from the colloidosomes, and the second faces are functionalized. An example of this process is illustrated in FIG. 5. In order to release the Janus particles, the wax droplets of the colloidosomes are dissolved. This is done by adding a hydrophobic solvent to a suspension of the colloidosomes. In some embodiments, the solvent is dichloromethane or benzene. However, any appropriate solvent for dissolving lipophilic materials can be used (e.g., hydrophobic solvents such as acetone, kerosene, hexanes, pentane, chloroform, or mixtures thereof).

The freed particles have exposed second faces, which are then functionalized to have a different functionality than the first faces. For example, if the first faces have biocidal functionalities, the second faces can be modified to include functionalities for matrix-binding, lubrication, different biocidal activity, flame-retardancy, etc. If the first faces do not have biocidal functionalities, the second faces are modified to include biocides. In some embodiments, the first and second faces are each functionalized with different biocides. Examples of functionalities that can be used for the second faces include the functionalities discussed above with respect to the first faces.

The biocidal Janus particles are then distributed into a polymer matrix to produce a biocidal material. This is illustrated at step 150. Any conventional techniques for distributing particles into polymer matrices can be used. The appropriate selection of a technique can be determined by a person of ordinary skill in the art (e.g., based on type of polymer, size of particles, planned final product, etc.). For example, the Janus particles can be blended into the polymers at various processing stages. The biocidal Janus particles can be distributed using a variety of conventional techniques in addition to blending. One example involves spraying or dipping an extruded polymer in a carrier fluid (e.g., acetic acid, acetonitrile, acetone, butyl alcohol, dichloromethane, dimethylformamide, dimethylsulfoxide, 1,4-dioxane, ethanol, formic acid, isopropanol, methanol, n-propanol, tetrahydrofuran, etc.) that contains the particles.

The biocidal Janus particles may also be deposited in coatings (e.g., by spraying, dipping, curtain casting, and/or cascade casting) on a material surface. The coatings can include additional materials such as carrier fluids and binders (e.g., alginate, cellulose-based polymers, gelatin, natural gums, pectins, starch-based polymers, polyacrylates, polyethers, polyacrylamides, polyvinyl alcohol, maleic anhydride copolymers, hydrolyzed acrylonitrile grafted starch, acrylic acid grafted starch, polyvinyl pyrrolidine, poly(2-hydroxyethylacrylate), poly(2-hydroxyethyl-methacrylate), poly(sodium acrylate-co-acrylic acid), polyvinyl sulfonate, polyvinyl sulfonic acid, polyethylene oxide, and block copolymers of ethylene oxide with polyamides, polyesters, or polyurethanes, etc.).

If the Janus particles include matrix-binding functionalities (e.g., vinyl, epoxy, or acrylate groups), they can bind to the polymers. However, the particles can also be blended into polymer matrices without binding. For example, biocidal Janus particles with one face having fluorinated moieties acting as lubricating agents can be blended into a polymer, followed by blending again prior to usage in order to drive the particles throughout the matrix. In some embodiments, rheology control agents (e.g., microgels, silica, and polyacrylic acids) can be added, causing the fluorinated Janus particles to travel to the surface of the matrix polymer. Curing then creates a biocidal barrier on the surface of the polymeric material.

Examples of polymer matrices into which the particles can be incorporated can include aliphatic and aromatic polyesters (e.g., polyethylene terephthalate, polybutylene terephthalate, polyethylene isophthalate, polyhexamethylene terephthalate, polylactic acid, polyglycolic acid, and liquid crystalline polymers for high performance resins and fibers), aliphatic and aromatic polyamides (e.g., nylon 6, nylon 11, nylon 12, nylon 610, nylon 1212, poly-p-phenylene terephthalamide, and poly-m-phenylene isophthalamide), polyolefins (e.g., polyethylene and polypropylene), vinyl polymers (e.g., polystyrene, polyacrylonitrile, polyvinylalcohol, polyvinyl acetate, polyvinyl alcohol, polyvinyl chloride, polyvinylidene chloride, polyvinyl pyrrolidine, acrylonitrile butadiene styrene (ABS) resins, and acrylic resins), copolymers of ethylene and vinyl acetate, fluorocarbon polymers (e.g., polytetrafluoroethylene, polyvinylidene fluoride, and polyvinyl fluoride), polyurethanes, segmented polyurethane elastomers, elastane, polyethers, polyacetals, polyketones, polyetherether ketone (PEEK), polyether ketoneketone (PEKK), polysulfides, polysulfones, polysiloxanes (e.g., polydimethyl siloxane), polycarbonates, thermosetting synthetic polymers (e.g., phenol-formaldehyde copolymer), natural fibers (e.g., wool, silk, cotton, and linen), alginates, cellulosic polymers (e.g., carboxymethylcellulose, cellulose acetate phthalate, hydroxymethyl cellulose, and methyl cellulose), regenerated or semi-synthetic polymers (e.g., rayon, cuprammonium rayon, acetate rayon, triacetate rayon, reconstituted silk, and polysaccharides), gelatin, natural gums (e.g., gum arabic, locust bean gum, carrageenan gum, and xanthan gum), pectins, starch-based polymers, and maleic anhydride copolymers, as well as salt forms, mixtures, copolymers, and terpolymers thereof.

It should be noted that, while the provision of a biocide at step 125 is illustrated as occurring after the formation of a colloidosome at step 120, biocide-sources can be provided at any point in process 100 prior to biocidal functionalization of a Janus particle at step 130. That is, provision of a biocide can occur before step 110 or between steps 110 and 120. Provision of a biocide can also occur simultaneously with step 110, 120, or 130 in some embodiments.

FIG. 2 is a schematic diagram illustrating a process 200 of forming colloidosomes, according to some embodiments of the present disclosure. Reaction vessels are illustrated containing the mixtures used in process 200. However, the size and shape of the reaction vessels are not meant to represent actual reaction vessels used in this process. Any suitable reaction vessels can be used (e.g., beakers, flasks, test tubes, etc.), depending upon the volume of the reaction mixture, temperature and scale of the reaction, and the reactivity of its components.

In process 200, primary particles are formed in a reaction that occurs upon mixing a catalyst solution 210 and tetra-ethoxysilane (TEOS) 220. In some embodiments, TEOS 220 is replaced by another tetraalkyl orthosilicate, such as tetramethylsilane, tetraphenylsilane, or combinations thereof. The catalyst solution 210 includes ammonia ($NH_3$) and ethanol (EtOH) in excess water ($H_2O$). However, EtOH can be replaced by another low molar-mass alcohol (e.g., methanol, n-propanol, or n-butanol). TEOS 220 is added to the catalyst solution 210, resulting in an $NH_3$-catalyzed hydrolysis reaction to form silanol, followed by condensation to silica, resulting in silica nanoparticles or microparticles. The volume and concentration of reactants added depends upon the exact scale of the reaction, as well as desired particle size, but in some embodiments, the concentrations are approximately 0.1 M-0.5 M TEOS, 0.5 M-17.0 M $H_2O$, and 0.5 M-5 M $NH_3$.

The mixture of catalyst solution 210 and TEOS 220 produces a suspension 230 containing silica particles, which are represented by gray spheres. The spheres are for illustrative purposes, and the actual size, shape, and quantity of silica primary particles in the suspension 230 depend upon the scale and conditions of the reaction. In some embodiments, the particles range in size from about 100 nm-160 nm or up to about 800 nm, though other sizes are possible. Particle size and shape are discussed in greater detail with respect to FIG. 1.

The silica particles are separated from the solution, washed with methanol and deionized water, and dried. The particles are then resuspended in an approximately 7% w/w EtOH/$H_2O$ solution, and a surfactant, n-cetyltrimethylammonium bromide (CTAB), is added to the suspension (e.g., $C_{CTAB}/S_{Silica}$=about $2.5 \times 10^{-6}$ to $5 \times 10^{-6}$ mol $L^{-1}$ $m^{-2}$, where $C_{CTAB}$ is the molar concentration of CTAB, and $S_{Silica}$ is the total surface area of the silica particles). In some embodiments, CTAB is replaced by another surfactant, such as sodium dodecyl sulfate (SDS) or sodium lauryl sulfate (SLS). The surfactant partially hydrophobizes the surfaces of the silica particles to facilitate their adsorption at the lipophile-water interface formed when wax is subsequently added.

The particle/surfactant suspension 240 is heated to approximately 65° C., and a paraffin wax 250 is added to the suspension 240. In some embodiments, the paraffin wax 250 has a melting point between 42° C. and 44° C. Paraffin waxes are typically mixtures of long alkanes ($C_nH_{2n+2}$, where n=20-40) with melting points that depend, at least in part, upon chain length (n). The melting points range from about 37° C. to about 68° C. Therefore, other melting points are possible (e.g., 53-57° C., 58-62° C., or 65-68° C.), and the temperature of the suspension can be adjusted as is needed to melt the wax 250. Additionally, waxes other than paraffin waxes can be used in some embodiments, such as carnauba wax or beeswax.

The elevated temperature is maintained until the wax 250 melts, at which point the mixture is vigorously stirred using a homogenizer operating at 9,000 rpm for 80 s, though other rotational speeds and times are possible (e.g., between about 6,000 rpm-10,000 rpm and about 30 s-90 s). The mixture is then allowed to cool to a temperature such that the wax 250 can solidify, (e.g., about 20-30° C.). As the wax 250 solidifies (e.g., over about 12 h at room temperature), a suspension 260 of the colloidosomes forms.

A simple diagram of a representative colloidosome 265 from this suspension 260 is illustrated in FIG. 2. The diagram includes a cross-sectional view of a wax droplet 270, which has a silica particle monolayer 280 partially embedded in its surface. The embedded portions of the silica particles 280 are represented by a darker gray than the exposed portions for illustrative purposes. The colloidosomes are filtered out of the suspension 260, and are then washed in acid (e.g., hydrochloric or sulfuric acid) to remove remaining surfactant from the first faces of the partially embedded silica particles 280. The exposed first faces are then able to be functionalized. Functionalization of the first faces of primary particles is discussed in greater detail with respect to FIGS. 4A and 4B.

It should be noted that the diagram of the colloidosome 265 includes only a small number of particles 280 embedded in the wax droplet 270, and these particles 280 are not to scale with the wax droplet 270. This is for simplicity, and it should be understood that the quantity of embedded primary particles 280 depends upon the size of the particles 280, the size of the wax droplet 270, and the concentrations of the various reaction components.

FIG. 3 is a chemical reaction diagram illustrating a process 300 of modifying a biocidal compound to include a silica-binding moiety, according to some embodiments of the present disclosure. Compounds having triethoxysilyl (—$OCH_2CH_3$) moieties are able to bind to silica particles through reactions involving the triethoxysilyl moieties and hydroxyl groups on the particles. Therefore, a wide variety of biocides can be modified to include triethoxysilyl moieties, allowing them to be bound to one or more faces of a Janus particle. In process 300, the biocide is triclosan 310.

A solution of triclosan 310 in dry toluene is prepared under an inert atmosphere (e.g., $N_2$ or Ar). In some embodiments, the concentration of the triclosan solution is about 0.7 M, though other concentrations can be used (e.g., about 0.5 M-1.5 M). Approximately 1.5 equivalents each of 3-(triethoxysilyl) propyl isocyanate 320 and tetraoctyltin (Sn $((CH_2)_7CH_3)_4$) 330 are added simultaneously to the solution. The reaction mixture is stirred at room temperature until reaction progress can no longer be detected. Progress of the reaction can be determined using thin layer chromatography (TLC) (e.g., with silica gel TLC plates and a 4:1 n-hexane:ethyl acetate solvent mixture). The toluene is then evaporated until an off-white oil remains. The oil contains the modified biocide, triclosan-(3-triethoxysilyl) propyl isocyanate (TTESPC) 340. TTESPC 340 is recrystallized from the oil, resulting in a white crystalline solid. The solid TTESPC 340 is filtered with cold n-hexane to remove remaining traces of tetraoctyltin 330 and then dried under vacuum.

FIG. 4A is a chemical reaction diagram illustrating a process 400-1 of attaching polymer matrix-binding functionalities to a first face of a colloidosomal silica particle 410, according to some embodiments of the present disclosure. A cross-sectional view of the particle 410 partially embedded in a wax droplet 270 is illustrated. This represents one particle 410 in a monolayer such as the monolayer 280 from the colloidosome suspension 260 of FIG. 2, after the surfactant has been washed away. Modifications to silica particles involve surface chemistry with hydroxyl groups exposed by this washing. The cross-sectional view includes several representative hydroxyl (—OH) groups on the silica particle 410, though the exposed surface of the particle 410 would be substantially covered in hydroxyl groups.

The colloidosomal silica particle 410 is exposed to a functionalizing compound, vinyl chloride 420, that will provide vinyl (—CHCH$_2$) groups for binding to the first face of the primary particle 410. A reaction between vinyl chloride 420 and the hydroxyl groups on the exposed face of the silica particle 410 produces a vinyl-functionalized colloidosomal silica particle 430. When subsequently produced Janus particles that include these vinyl functionalities are dispersed into a polymer, the vinyl groups will bind to a polymer matrix. A variety of non-biocidal functionalities can be added to the first faces in process 400-1 using conventional techniques. Organohalide compounds analogous to vinyl chloride can be used to provide alternative matrix-binding functionalities in some embodiments (e.g., epoxides, acrylates, amines, allyls, etc.). In other embodiments, biocidal functionalities can be attached to the first faces. This is discussed in greater detail with respect to FIG. 4B.

FIG. 4B is a chemical reaction diagram illustrating a process 400-2 of attaching biocidal functionalities to the first face of the colloidosomal silica particle 410, according to some embodiments of the present disclosure. Process 400-2 involves binding of TTESPC 340 (illustrated in FIG. 3) to the colloidosomal primary particle 410. A solution of TTESPC 340 in ethanol (e.g., about 2.5% w/v) is added to a suspension of colloidosomal primary particles represented by particle 410. The mixture is stirred for at least 15 minutes in order to hydrolyze the silicate groups of TTESPC 340. In some embodiments, the reaction mixture is allowed to react for a longer period of time after stirring (e.g., about 10 min-20 min, about 1 h-3 h, about 12 h, or about 24 h).

Exposing the hydrolyzed TTESPC 340 to the colloidosomal primary particle 410 allows the triclosan functionalities to bind to the first face, forming a colloidosomal triclosan-functionalized particle 440. The illustrated triclosan-functionalized particle 440 represents the entire ensemble of substantially similar triclosan-functionalized particles formed in process 400-2. For simplicity, the diagram of particle 440 includes only one triclosan functionality. However, all of the hydroxyl groups on the exposed face are capable of binding a triclosan functionality, depending upon steric hindrance, temperature, reaction time, relative concentrations of reactants, etc. In some embodiments, the majority (e.g., 60-99%) of the exposed face is covered in triclosan functionalities, though lower percent coverages are possible. The total area, distribution, and density of coverage depend upon various thermodynamic and steric factors, as will be understood by a person of ordinary skill in the art.

FIG. 5 is a chemical reaction diagram illustrating a process 500 of functionalizing the second faces of partially functionalized particles, according to some embodiments of the present disclosure. Reaction vessels are illustrated containing the mixtures used in process 500. However, the size and shape of the reaction vessels are not meant to represent actual reaction vessels used in this process. Any suitable reaction vessels can be used (e.g., beakers, flasks, test tubes, etc.), depending upon the volume of the reaction mixture, temperature and scale of the reaction, and the reactivity of its components.

A suspension of functionalized colloidosomes 510 is prepared. A cross-sectional view 520 of a representative colloidosome having a monolayer of partially functionalized primary particles 530 embedded in the surface of the wax droplet 270 is illustrated. The particles 530 can be particles represented by particle 430 (illustrated in FIG. 4A), particle 440 (illustrated in FIG. 4B), or particles with alternative biocidal or non-biocidal functionalities. Examples of alternative functionalities are discussed in greater detail above. The first faces of the particles 530 are illustrated in black with wavy lines representing bound functionalities (e.g., biocidal or matrix-binding functionalities). The second faces of the particles 530 are illustrated in dark gray.

Added to the suspension 510 is a hydrophobic solvent capable of dissolving the wax droplet 270. In some embodiments, the solvent is benzene, though other solvents can be used as well (e.g., dichloromethane or hydrocarbon solvents). Dissolving the wax droplet 270 results in a suspension 540 of free partially functionalized particles 530. Four of these free particles 530 are represented by a schematic diagram 550 illustrating the first faces (black with wavy lines for functionalities) and newly exposed second faces (dark gray). The suspension 540 is centrifuged and decanted one or more times to remove the dissolved wax.

In a new suspension 560, a second source of functionalities is mixed with the partially functionalized particles 530. In some embodiments (e.g., when the first functionalities are not triclosan functionalities), the functionality source is a biocide with a modified functionality for binding to silica, such as TTESPC 340 (illustrated in FIG. 3). Additional examples of biocides that can be used with this modification are discussed in greater detail with respect to FIG. 1. Compounds that can provide functional groups for matrix-binding (e.g., vinyl chloride 420, illustrated in FIG. 4A, allyl chloride, or epichlorohydrin), lubrication (e.g., perfluorocarbons), and other activities (see, e.g., FIG. 1) can also be used to attach functional groups to the second faces of the particles 530 when the first faces have biocidal functionalities.

A schematic diagram 570 represents four biocidal Janus particles 580 formed in the suspension 560. The Janus particles 580 are illustrated with dark gray straight lines representing the functionalities on the second faces and black wavy lines representing functionalities on the first faces Like the functionalities on the first faces, the second functionalities are bound to hydroxyl groups from the silica particles 580. Any of the hydroxyl groups on the exposed second faces are capable of binding the second functionalities, depending upon steric hindrance, temperature, reaction time, relative concentrations, etc. In some embodiments, the majority (e.g., 60-99%) of each exposed second face is covered in biocidal functionalities, though lower percent coverages are possible. Further, the distribution and density of coverage depend upon various thermodynamic and steric factors.

In an example of process 500 wherein the particles 530 have biocidal first functionalities, trichloro(3,3,4,4,5,5,6,6,7,7,8,8,9,9,10,10,10-heptadecafluorodecyl)silane (not shown) is added dropwise to a toluene suspension of the partially functionalized biocidal particles 530. The mixture is stirred with a magnetic stir bar, and then allowed to react for about 24 h at approximately 35° C. The reaction produces biocidal Janus particles 580 having second faces with lubricating perfluorocarbon functionalities. The reaction mixture is cooled to room temperature, filtered, and washed with ethanol at least twice to remove excess silane. The biocidal Janus particles 580 with perfluorocarbon functionalities are then dried in vacuo.

The biocidal Janus particles 580 formed in process 500 are then incorporated into a polymeric material. This can involve chemical reactions to form bonds with the polymer matrix (e.g., when one Janus particle face has matrix-binding functionalities) or by blending (e.g., when one Janus particle face has perfluorocarbon functionalities). Techniques for incorporating the Janus particles 580 into polymeric matrices are discussed in greater detail with respect to FIG. 1, as are examples of polymeric matrices that can be used.

The compounds described herein can contain one or more chiral centers. Unless otherwise noted, the disclosed structures cover all stereoisomers, conformers, rotamers, isomers, and enantiomers of the represented compounds. Further, polymers or other materials containing the disclosed compounds and/or particles can include racemic forms of the compounds in addition to individual stereoisomers, as well as mixtures containing any of these. Substituents on the Janus particles and/or functionalities described herein may participate in additional chemical reactions, transformations, or interactions, which can include synthesis, decomposition, single and/or double replacement, oxidation/reduction, acid/base, nucleophilic, electrophilic and radical substitutions, addition/elimination reactions, and polymerization reactions.

The processes discussed herein and their accompanying drawings are not to be construed as limiting. One skilled in the art would recognize that a variety of techniques may be used that vary in conditions, components, methods, etc., which ultimately generate biocidal Janus particles. In addition, the conditions can optionally be changed over the course of a process. Further, in some embodiments processes can be added, omitted, or carried out in alternate orders, while still remaining within the scope of the disclosure, as will be understood by a person of ordinary skill in the art. It should also be noted that processes can be carried out by a single entity, or by multiple entities. For example, a first entity may produce the biocides, a second entity may produce the primary particles, and a third entity may prepare the biocidal Janus particles.

Unless otherwise noted, chemical reactions are performed at ambient conditions or under slight heating with no special atmosphere or head space, and may be performed using standard organic solvents to manage mix properties such as viscosity and flow index. Standard procedures for quenching the reaction, solvent removal, and purification are performed. It should be noted that ranges (e.g., time, concentration, temperature, etc.) indicated herein include both endpoints and all numbers between the endpoints. Unless specified otherwise, the use of "about" or "approximately" in connection to a range applies to both ends of the range (e.g., "approximately 1 g-5 g" should be interpreted as "approximately 1 g-approximately 5 g").

What is claimed is:

1. A material, comprising:
    a particle, comprising:
        biocidal functionalities bound to a first face of the particle; and
        matrix-binding functionalities bound to a second face of the particle; and
    a polymer matrix linked to the particle by covalent bonds between the polymer matrix and the matrix-binding functionalities; wherein the particle is a silica nanoparticle; wherein the biocidal functionalities are derived from triclosan.

2. The material of claim 1, wherein the matrix-binding functionalities are selected from a group consisting of vinyl groups, epoxide groups, and acrylate groups.

3. An article of manufacture comprising:
    a polymer matrix; and
    particles, comprising:
    first faces bound to biocidal functionalities; and
    second faces bound to non-biocidal functionalities, wherein the particles are linked to the polymer matrix by covalent bonds between the polymer matrix and the non-biocidal functionalities; wherein the particle is a silica nanoparticle; wherein the biocidal functionalities are derived from triclosan.

4. The article of manufacture of claim 3, wherein the polymer matrix is a vinyl polymer.

5. The article of manufacture of claim 3, wherein the polymer matrix is a polyester.

6. The article of manufacture of claim 3, further comprising a rheology control agent.

* * * * *